Jan. 20, 1970     J. BASSOT ET AL     3,490,425

SYSTEM FOR PRESSURIZING AND RELIEVING LIQUIDS IN CONDUITS

Filed Sept. 28, 1967     2 Sheets-Sheet 1

United States Patent Office 3,490,425
Patented Jan. 20, 1970

3,490,425
SYSTEM FOR PRESSURIZING AND RELIEVING LIQUIDS IN CONDUITS
Jacques Bassot, Paris, and Louis Monpetit, Etang-la-Ville, France, assignors to Société des Procedes Modernes d'Injection Sopromi, Boulogne, France
Filed Sept. 28, 1967, Ser. No. 671,499
Claims priority, application France, Sept. 30, 1966, 78,305
Int. Cl. F02m 39/00, 59/44, F02b 39/16
U.S. Cl. 123—139      8 Claims

ABSTRACT OF THE DISCLOSURE

A suction pump pumps fuel from a fuel tank into a high pressure hydraulic circuit. Connection from high pressure circuit to conduit controlled by solenoid valve. Low pressure return circuit to fuel tank. Second solenoid valve controls connection from conduit to low pressure circuit. Thyristor circuit for energizing the two valve coils, including a capacitor to store energy liberated when the valve coil current is interrupted, to be used in subsequent cycle.

Cross-reference to a related application

This invention relates to a system for pressurizing and relieving liquids in conduits discussed in U.S. patent application Ser. No. 630,035, filed Apr. 11, 1967 entitled "A High Speed Fuel Injection System."

Background of the invention

The present invention relates to an arrangement for pressurizing and rapidly relieving liquids in conduits which receive such liquids from a pressure source.

In certain fields in which such pressure sources, constituted by a pump with or without pressure tanks and a valve, are used for pressurizing liquid in conduits installed downstream of the valve, it is often necessary, after the liquid in the conduit is pressurized for a certain period of time, to suddenly relieve the pressure upon closing of the valve. This is particularly the case if such systems are employed for controlling the injection of fuel in internal combustion engines with conventional mechanical fuel injectors.

Summary of the invention

It is the object of the present invention to solve this problem. This invention therefore constitutes a system for pressurizing and rapidly relieving liquids in conduits. It consists of a high pressure source and a low pressure return circuit. It further comprises regulating means adapted to connect said high pressure source to said conduit in response to an "opening" control signal, and further adapted to interrupt said high pressure connection upon receipt of a "closing" control signal, and also adapted to connect said conduit to said low pressure return circuit upon receipt, and for the duration of said closing control signal, the pressure in said conduit dropping suddenly to a predetermined value depending on the length of time said conduit is connected to said low pressure return circuit. Finally, there are control signal generating means for generating said opening and closing control signals as a function of external parameters.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawings.

Description of the preferred embodiments

Figure 1:
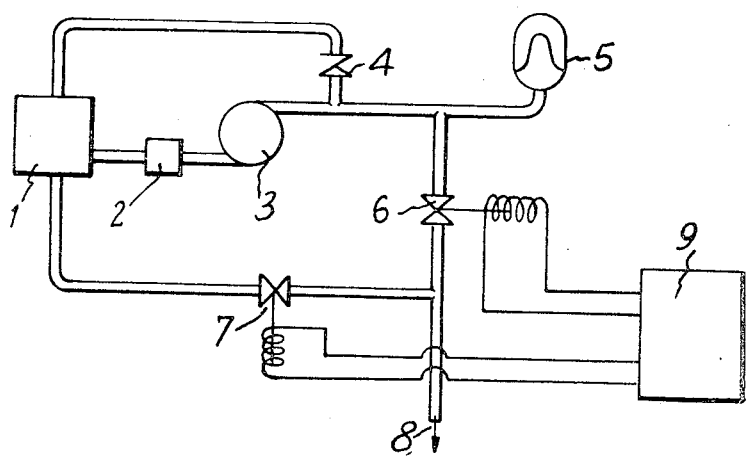
FIG. 1 is a schematic diagram of the arrangement according to this invention using two valves as regulating means.

Referring now to FIG. 1, a suction pump 3 pumps fuel through a filter 2 from a fuel tank 1 and discharges into a high pressure hydraulic circuit preferably but not necessarily including an accumulator 5. Also optional is a relief valve 4, which allows surplus fuel drawn by the pump 3 to be returned into the tank 1.

Regulating means, here a first solenoid valve 6, control admission of fuel to a conduit whose outlet 8 discharges feul at a controlled pressure.

Upon closing of the solenoid valve 6, a similar second solenoid valve 7, also part of the regulating means, opens suddenly to relieve the pressure in conduit 8. Reference numeral 9 denotes a control signal generating means.

The arrangement according to this invention does not specify network connected to outlet 8 which may consist of various types of apparatus as for example a mechanical injection system for motors.

In the latter case, one can utilize either a single solenoid valve 6 and a single second solenoid valve 7 connected to mechanical injectors by means of a distributor, or a solenoid valve 6 and a second solenoid valve 7 for each conventional mechanical injector.

The operation of the arrangement is as follows:

In FIG. 1, solenoid valve 6 is opened for a regular and regulatable time while solenoid valve member 7 is closed such that during the time of its openings the conduit 8 is connected with the high pressure source consisting of the pump 3 and the accumulator 5. At the moment at which the solenoid valve 6 is closed, the solenoid valve 7 is opened at least shortly so that the pressure in the conduit 8 drops abruptly to a pressure at least equal to the fuel tank pressure. Of course, depending on the hydraulic characteristics of the arrangement downstream of the outlet 8, on the hydraulic characteristics of the solenoid valves 6 and 7, and the opening time of the solenoid valve 7 the residual pressure after the closing of the valve 7 may be higher than the pressure in the fuel tank 1. The residual pressure can be regulated accurately by controlling the length of time during which the valve 7 remains open.

Figure 2:
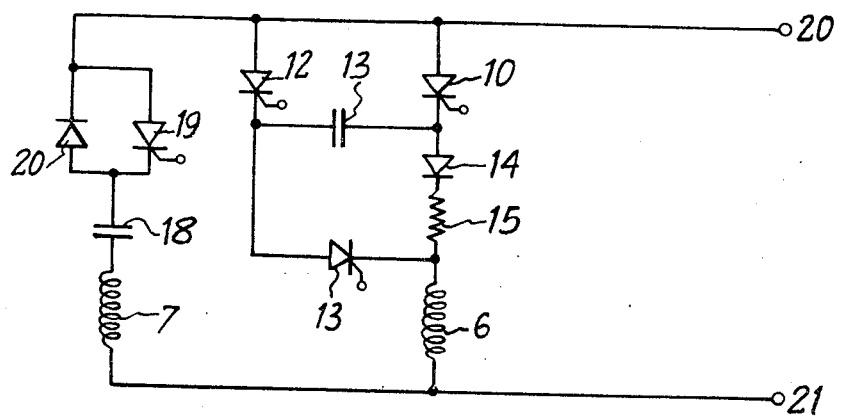
FIG. 2 is an electrical diagram of electronic control signal generating means for the arrangement according to FIG. 1.

Control signal generating means, here an electronic control arrangement of which a part is shown in FIG. 2 is fed from a constant voltage source between the points 21 and 22. Solenoid valves 6 and 7 are represented by their coils. The arrangement of the thyristors 10, 12 and 11, the condensor 13, the diode 14, the resistor 15, is a control signal generating arrangement for the solenoid valve 6 as has been described in U.S. application Ser. No. 630,035, filed Apr. 11, 1967, by the applicant for the same assignee. Thyristors 10 and 11 are fired together by signals applied to their gates by a source which is not shown. This causes the opening of the solenoid valve 6. Firing of thyristor 12 causes the closing of the valve with recovery of energy in the capacitor 13. To this is added the arrangement consisting of thyristor 19, diode 20, capacitor 18, and solenoid valve 7.

At the moment of activation of the thyristor 12, that is at the moment the end of the injection takes place by closing of the solenoid valve 6, it is only necessary also to send a control signal to the gate of thyristor 19 which causes an oscillation in the oscillator circuit consisting of the condensor 18 and the coil of the solenoid valve 7. Actually, a double action results in the form of a pair of pulses which correspond to the sinusoids in the oscillating circuit. In any case, the actual time of opening of the valve 7 may be regulated either by changing the value of the capacitance of condensor 18, or by inserting a variable resistance into the oscillating circuit consisting of coil 7 and capacitor 18. This variable resistance is not shown. It should be understood that various modifications of the foregoing arrangement are possible. For example, the solenoid valve 7 may be controlled in such a manner that it remains open during the whole time that the solenoid valve 6 is closed.

It should finally also be understood that a similar arrangement may be embodied in a single triple-action solenoid valve as for example set forth in the description of injectors described in the U.S. application Ser. No. 630,035, filed Apr. 11, 1967, for the same assignee and in which a needle valve is replaced by a piston valve.

Figure 3:
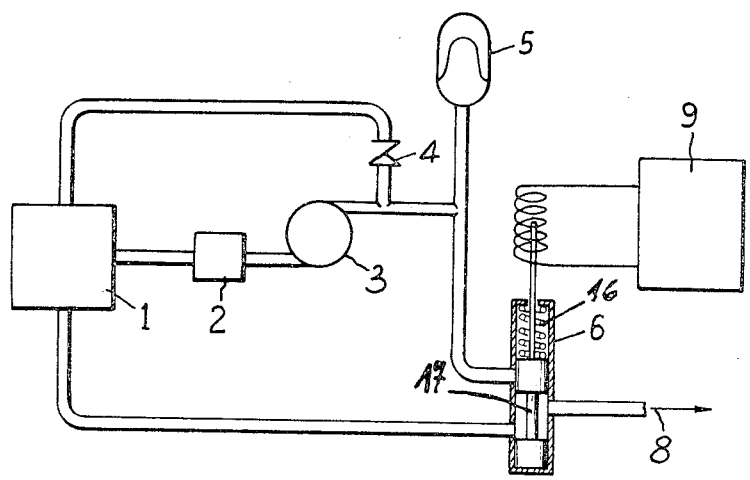
FIG. 3 is a schematic diagram of an arrangement using a single valve.

One embodiment, using a triple-action valve having one coil, is shown in FIG. 3. Here energization of the coil causes connection from the high pressure source to the conduit 8, while deenergization of the coil causes the piston 17 to move, by means of automatic return mechanism 16, to connect the low pressure return circuit to the conduit 8.

Figure 4:
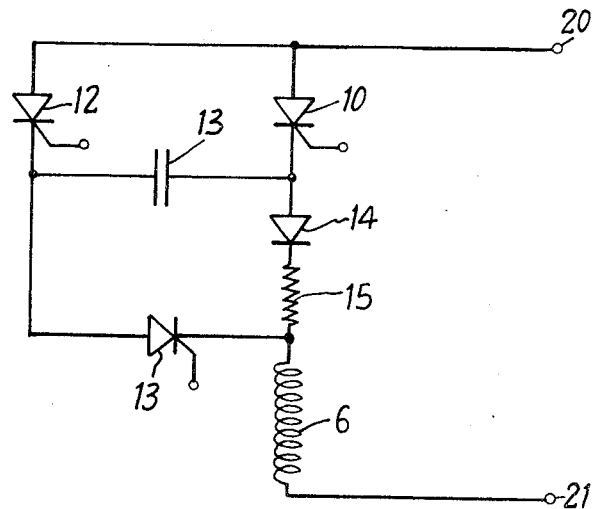
FIG. 4 is an electrical diagram of electronic control signal generating means for the arrangement according to FIG. 3.

FIG. 4 shows the control circuit for this type of valve arrangement.

What is claimed as new and desired to be protected by Letters Patent is set forth in the appended claims:

1. In a hydraulic system for supplying fuel to a conduit adapted to feed the injectors of an internal combustion engine, the improvement of a means for rapidly relieving pressure in said conduit comprising:
   a source of fuel under pressure,
   a low pressure return line,
   a first valve between said source of fuel under pressure and said conduit,
   a second valve between said low pressure return line and said conduit, said second valve being downstream from said first valve, and
   means to provide a plurality of actuating signals, each of said signals having a predetermined time duration,
   said first valve being responsive to said actuating signals to open at the initiation of each of said actuating signals, to remain open for said time duration of each of said actuating signals, and to close at the termination of each of said actuating signals, said first valve when open placing said conduit in communication with said source of fuel under pressure and when closed shutting off communication between said conduit and said source,
   said second valve being responsive to the termination of each of said actuating signals to open at the termination of each of said actuating signals, said second valve when open placing said conduit in communication with said low pressure return line and when closed shutting off communication between said conduit and said return line, said second valve operatively connected to close no later than on said initiation of each of said actuating signals,
   said source of fuel under pressure being adapted to provide said fluid under substantially constant pressure throughout at least said duration of each of said actuating signals.

2. The improvement of claim 1 further characterized by:
   means to provide a second signal,
   said second valve when opened being responsive to said second signal to close upon receipt of said second signal,
   one of said second signals being generated after the termination of each of said plurality of actuating signals, and no later than the initiation of the subsequent one of each of said plurality of actuating signals, the time duration between the termination of each of said actuating signals and the generation of the next successive one of said second signals being sufficiently great to provide a rapid and substantial drop in the pressure in said conduit.

3. The improvement of claim 1 further characterized by:
   said first valve and said second valve are mechanically interconnected so that the opening of said first valve closes said second valve and the closing of said first valve opens said second valve.

4. The improvement of claim 1 wherein said valves are solenoid operated.

5. The improvement of claim 2 wherein said first and second valves are solenoid valves responsive to said actuating signals.

6. The improvement of claim 3 wherein said valves are a solenoid operated valving arrangement responsive to said actuating electrical signal.

7. In a hydraulic system for supplying fuel to a conduit adapted to feed the injectors of an internal combustion engine, the improvement of a method for rapidly relieving pressure in said conduit comprising the steps of:
   providing fuel under substantially constant pressure,
   connecting said fuel under pressure to said conduit in response to the initiation of a first actuating signal,
   maintaining said communication between said fuel under constant pressure and said conduit for the duration of said first actuating signal,
   terminating said communication between said fuel under pressure and said conduit at the termination of said first actuating signal,
   substantially simultaneously with said terminating step, placing said conduit in communication with a low pressure return line, and
   subsequently shutting off communication between said conduit and said low pressure return line at a point in time no later than at the initiation of a second actuating signal.

8. The method of claim 7 wherein:
   said step of subsequently shutting off communication between said conduit and said return line is taken concurrently with the initiation of a second actuating signal.

References Cited

UNITED STATES PATENTS

| | | | |
|---|---|---|---|
| 2,863,437 | 12/1958 | Bessiere | 123—139 |
| 3,193,733 | 7/1965 | Orsino | 317—148.5 |

LAURENCE M. GOODRIDGE, Primary Examiner

U.S. Cl. X.R.

123—32, 119